United States Patent [19]

Jones

[11] Patent Number: 5,215,944
[45] Date of Patent: Jun. 1, 1993

[54] X-RAY ABSORBING GLASS COMPOSITIONS

[75] Inventor: James V. Jones, Pittsburgh, Pa.

[73] Assignee: PPG Industries, Inc., Pittsburgh, Pa.

[21] Appl. No.: 737,110

[22] Filed: Jul. 29, 1991

[51] Int. Cl.$^5$ .............................................. C03C 3/095
[52] U.S. Cl. .................................... 501/64; 252/478; 313/480
[58] Field of Search ............. 501/64, 69.72; 252/478; 313/480

[56] References Cited

U.S. PATENT DOCUMENTS

| | | | |
|---|---|---|---|
| 2,388,866 | 11/1945 | Partridge | 106/53 |
| 2,477,329 | 7/1949 | de Gier et al. | 250/141 |
| 2,782,319 | 2/1957 | McAlpine et al. | 250/83 |
| 2,901,366 | 8/1959 | Smith et al. | 106/52 |
| 3,220,816 | 11/1965 | Pillkington | 65/99 |
| 3,382,393 | 5/1968 | Schwartz | 313/92 |
| 3,422,298 | 1/1969 | De Gier | 313/64 |
| 3,461,078 | 8/1969 | Veres | 252/301.6 |
| 3,464,932 | 9/1969 | Connelly et al. | 252/478 |
| 3,610,994 | 10/1971 | Sheldon | 313/92 |
| 3,640,891 | 2/1972 | Lee et al. | 252/301.4 |
| 3,794,502 | 2/1974 | La Gronw et al. | 106/52 |
| 3,805,107 | 4/1974 | Boyd | 313/92 |
| 3,819,972 | 6/1974 | Sanner | 313/480 |
| 3,843,346 | 10/1974 | Edge et al. | 65/65 A |
| 4,015,966 | 4/1977 | Weaver | 501/64 |
| 4,065,696 | 12/1977 | Steierman | 313/480 |
| 4,065,697 | 12/1977 | Steierman | 313/480 |
| 4,179,638 | 12/1979 | Boyd et al. | 313/480 |
| 4,277,286 | 7/1981 | Boyd et al. | 106/52 |
| 4,331,770 | 5/1982 | Thompson | 501/64 |
| 4,337,410 | 6/1982 | Van der Geer et al. | 501/64 |
| 4,366,252 | 12/1982 | Weaver | 501/60 |
| 4,376,829 | 3/1983 | Daiku | 501/64 |
| 4,390,637 | 6/1983 | Daiku | 501/64 |
| 4,520,115 | 5/1985 | Speit et al. | 501/60 |
| 4,547,696 | 10/1985 | Strauss | 313/407 |
| 4,712,041 | 12/1987 | Greiner et al. | 313/407 |
| 4,716,334 | 12/1987 | Fendley et al. | 313/407 |
| 4,734,388 | 3/1988 | Cameron et al. | 501/64 |
| 4,737,681 | 4/1988 | Dietch et al. | 313/402 |
| 4,739,215 | 4/1988 | Adamski et al. | 313/402 |
| 4,745,330 | 5/1988 | Capek et al. | 313/407 |
| 4,752,265 | 6/1988 | Fendley et al. | 445/30 |
| 4,778,427 | 10/1988 | Strauss | 445/30 |
| 4,786,619 | 11/1988 | Gerrard et al. | 501/64 |
| 4,897,371 | 1/1990 | Suzuki et al. | 501/70 |
| 5,108,960 | 4/1992 | Boek et al. | 501/64 |

FOREIGN PATENT DOCUMENTS

| | | |
|---|---|---|
| 0156526 | 10/1985 | European Pat. Off. |
| 0360965 | 4/1990 | European Pat. Off. |
| 3721584A1 | 2/1988 | Fed. Rep. of Germany |
| 574275 | 12/1945 | United Kingdom |
| 589202 | 6/1947 | United Kingdom |
| 734444 | 8/1955 | United Kingdom |
| 946030 | 1/1964 | United Kingdom |
| 994118 | 6/1965 | United Kingdom |
| 1176296 | 1/1970 | United Kingdom |

OTHER PUBLICATIONS

*The American Journal of Science*, Fifth Series, Art. XXXI-"The Silicates of Strontium and Barium" by Pentti Eskola, pp. 331-375.

(List continued on next page.)

*Primary Examiner*—Mark L. Bell
*Attorney, Agent, or Firm*—Andrew C. Siminerio

[57] ABSTRACT

A glass, which is particularly adapted to be melted in conventional glass melting furnaces and formed on a molten tin bath, and which demonstrates exceptional absorption of X-rays with a minimum linear absorption coefficient, measured at 0.6 Angstroms, of 24/cm. and having excellent resistance to electron browning and/or X-ray browning and contains the following components, by weight percent: $SiO_2$ and $Al_2O_3$ constituting about 57.0 to 68.0% with $SiO_2$ constituting about 57.0 to 66.0% and $Al_2O_3$ constituting about 0 to 5.0%; $K_2O$ and $Na_2O$ constituting about 10.0 to 18.0% with $K_2O$ constituting about 7.0 to 11.0% and $Na_2O$ constituting about 4.0 to 8.0%; BaO and SrO constituting about 16.0 to 24.0% with BaO constituting about 0 to 13.0% and SrO constituting about 11.0 to 21.0%; and $CeO_2$ constituting about 0.1 to 1.0%.

12 Claims, 5 Drawing Sheets

OTHER PUBLICATIONS

*American Journal of Science*, Jan. 1927, "Immiscibility in Silicate Melts" by J. W. Greig, pp. 1-44.

"Properties of Soda-Strontium Oxide-Alumina-Silica Glasses", *The Journal of the American Ceramic Society*, (1948), vol. 31, No. 1, pp. 1-8.

*Journal of American Ceramic Society*, vol. 37, No. 11 (1954), "Surface Tension, Density, Viscosity and Electrical Resistivity of Molten Binary Alkaline-Earth Borates" by Leo Shartsis and H. F. Shermer, pp. 544-551.

*Journal of American Society*, vol. 39, (1956) "Compressibility of Binary Akaline-Earth Borate Glasses at High Pressures" by Charles E. Weir and Leo Shartsis, pp. 319-322.

"Studies on the Glass Formation of Borate Systems", *Journal of Ceramic Association Japan* by M. Imaoka, pp. 282-306.

"Studies of the Glass-Formation Range of Silicate Systems", *Journal of Ceramic Association, Japan*, by M. Imaoka and T. Yamazaki, pp. 215-223.

"Glass Formation in the $CaO-Al_2O_3$, $SrO-Al_2O_3$ and $BaO-Al_2O_3$ Systems by Queching Molten Droplets" by Frank, Berthold and Liebertz, Josef.

"Studies of Vitreous Systems with SrO as Principal Constituent", *Communication from the Dept. of Applied Petrology*, Rhenish-Westphalian Institute of Technology, Aachen, Germany.

"Glass: Science and Technology", *Glass Forming Systems*, vol. 1, Academic Press (1983) ed. D. R. Uhlmann and N. J. Kreidl, p. 154.

"VIII-Some Experiments on the Substitution of Potash in an Alkali-Lead OxideOSilica Glass for Electric Lamp Purposes" *Communication from the Research Laboratories of The General Electric Company, Ltd., England*, by J. H. Partridge, pp. 151-158.

"The Late Rev. W. V. Harcourt's Researches on Glass", *Nature*, Aug. 31, 1871, pp. 351 and 532.

"The Cristobalite Liquidus in the Alkali Oxide Silica Systems and the Heat of Fusion of Cristobalite", *Journal of American Chemical Society*, vol. 52, (1930) by F. C. Kracek, pp. 1436-1442.

"Properties of Aluminoborate Glasses of Group II Metal Oxides: I, Glass Formation and Thermal Expansion" *Journal of American Ceramic Society*, vol. 44, No. 12 (1961) by Chikara Hirayama, pp. 602-606.

"Thermal Expansion of Binary Alkaline-Earth Borate Glasses", *Journal of Research of the National Bureau of Standards*, Feb. 1956, vol. 56, No. 2, pp. 73-79.

"Standard Practices for Measuring Viscosity of Glass Above the Softening Point", *ASTM C 965-81*, (Reapproved 1986), pp. 304-307.

"Standard Method of Test for Linear Thermal Expansion of Rigid Solids With a Vitreous Silica Dilatomer" *ASTM E 228-71*, pp. 884-895.

"Standard Method of Test for Static Corrosion of Refractories By Molten Glass", *ASTM C 621-68*, (Reapproved 1973), pp. 598-605.

"Standard Method of Test for Annealing Point and Strain Point of Glass by Fiber Elongation", *ASTM C 336-71*, pp. 290-296.

"Standard Practices for Measurement of Liquidus Temperature of Glass by the Gradient Furance Method" *ASTM C 829-81*, (Reapproved 1986), pp. 257-261, 264-265.

"Values of the Mass Absorption Coefficients of the Elements in the Region from 0.1A to 10A", Appendix IV., *X-Ray Absorption and Emission in Analytical Chemistry*, H. A. Liebhafsky, H. G. Pfeiffer, E. H. Winslow, P. D. Zemany, pp. 313-317.

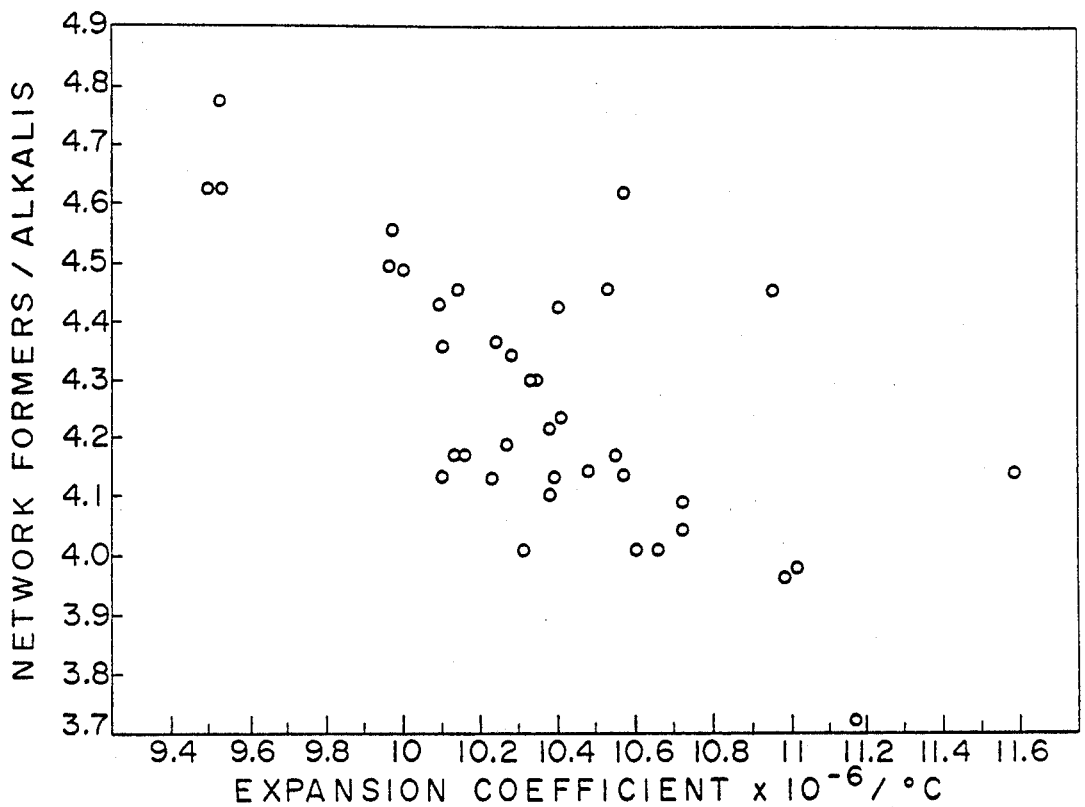
FIG.1 - LOWER NETWORK/ALKALI RAISES EXPANSION
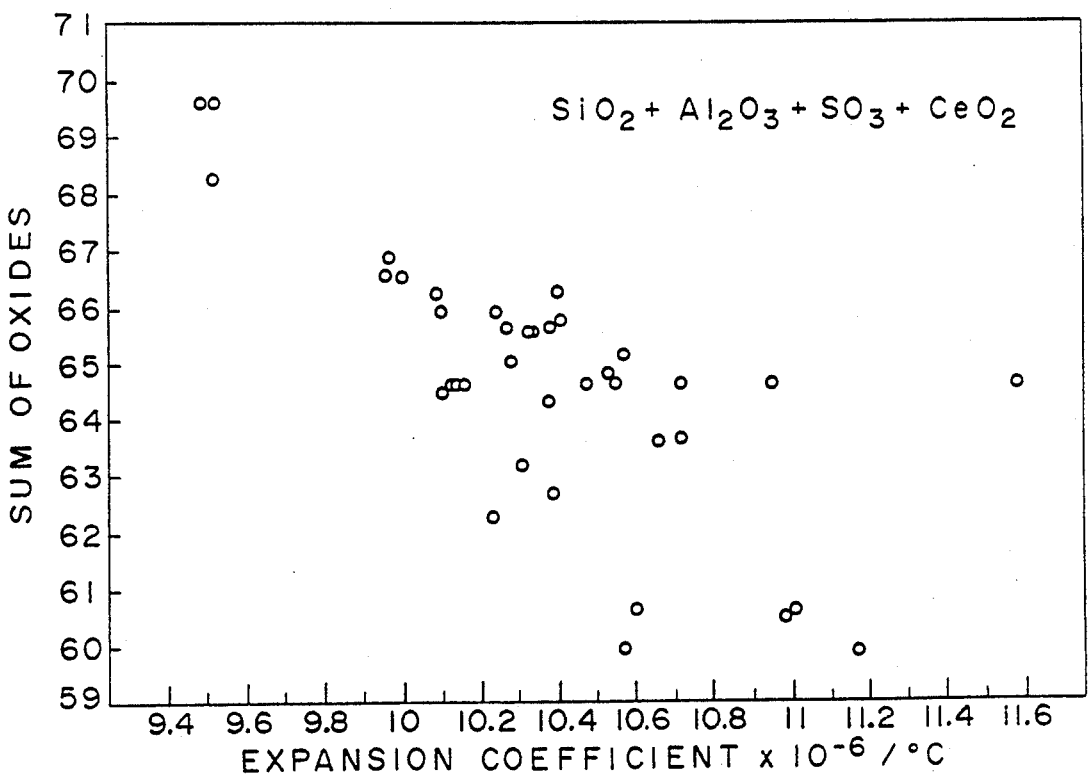
FIG.2 - DECREASES NETWORK RAISES EXPANSION

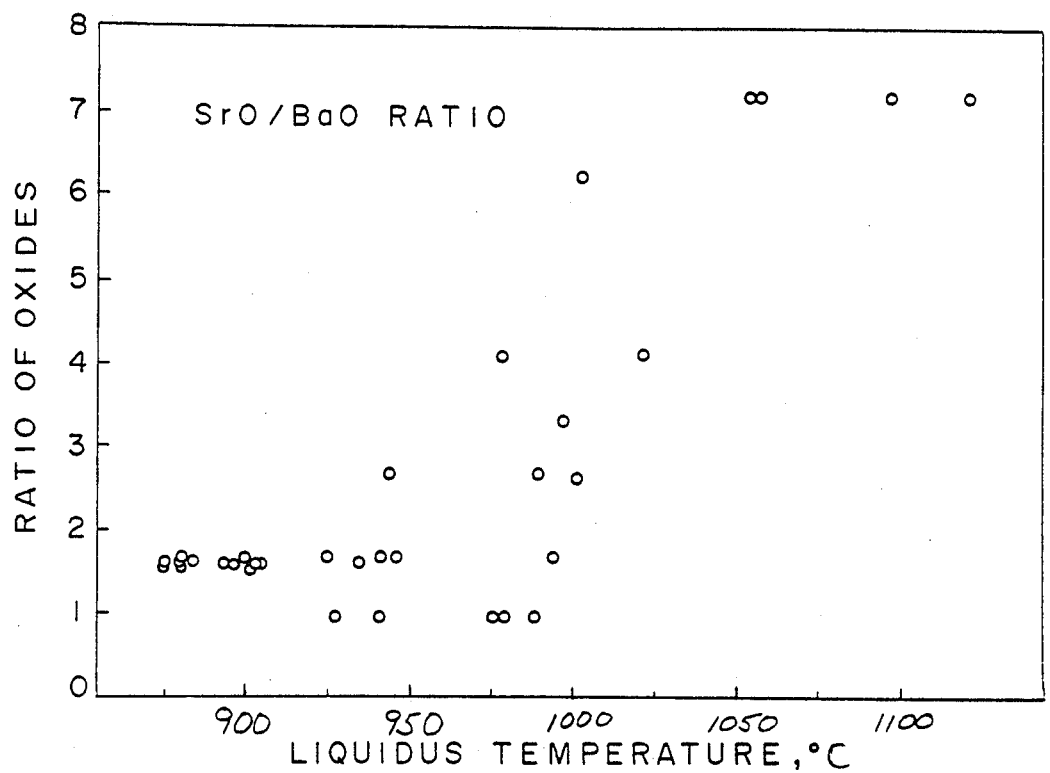
FIG.3—DECREASE SrO/BaO RATIO LOWERS LIQUIDUS
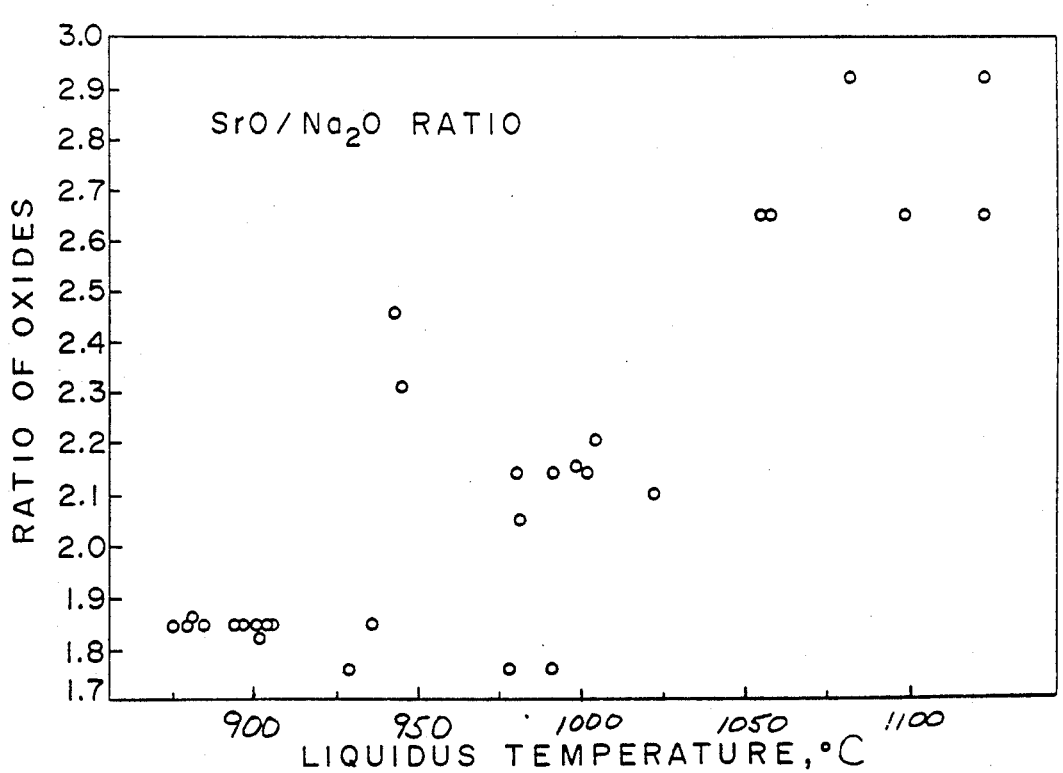
FIG.4—DECREASE SrO/$Na_2O$ RATIO LOWERS LIQUIDUS

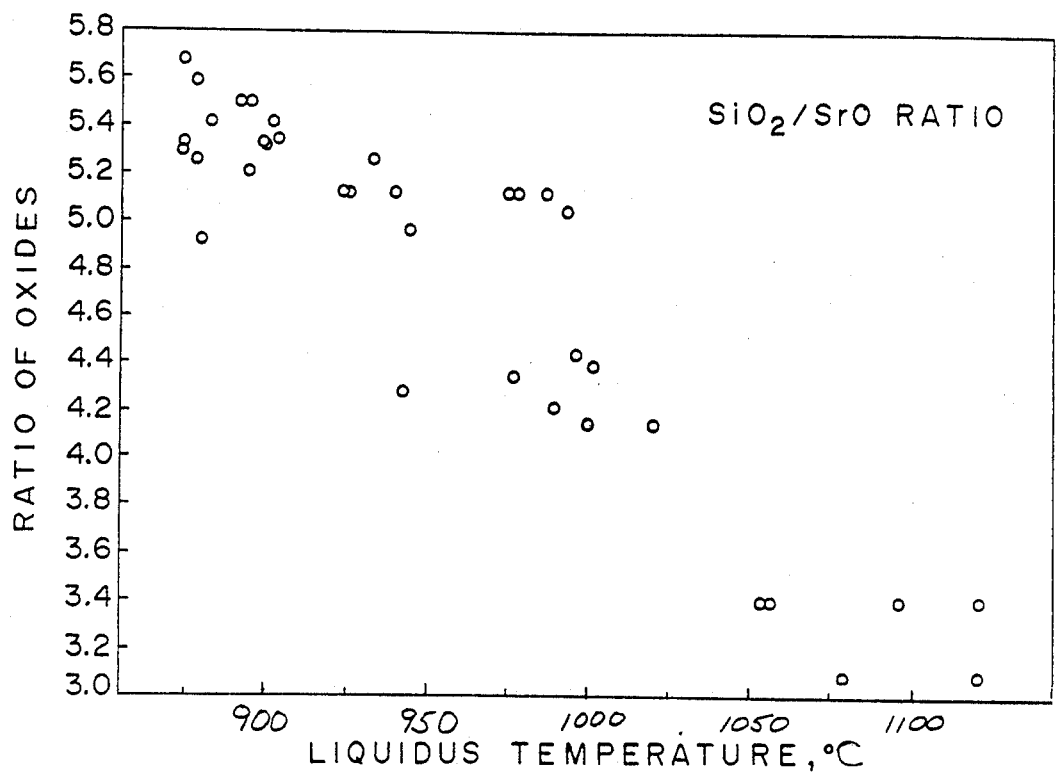
FIG.5-INCREASE SiO₂/SrO RATIO LOWERS LIQUIDUS
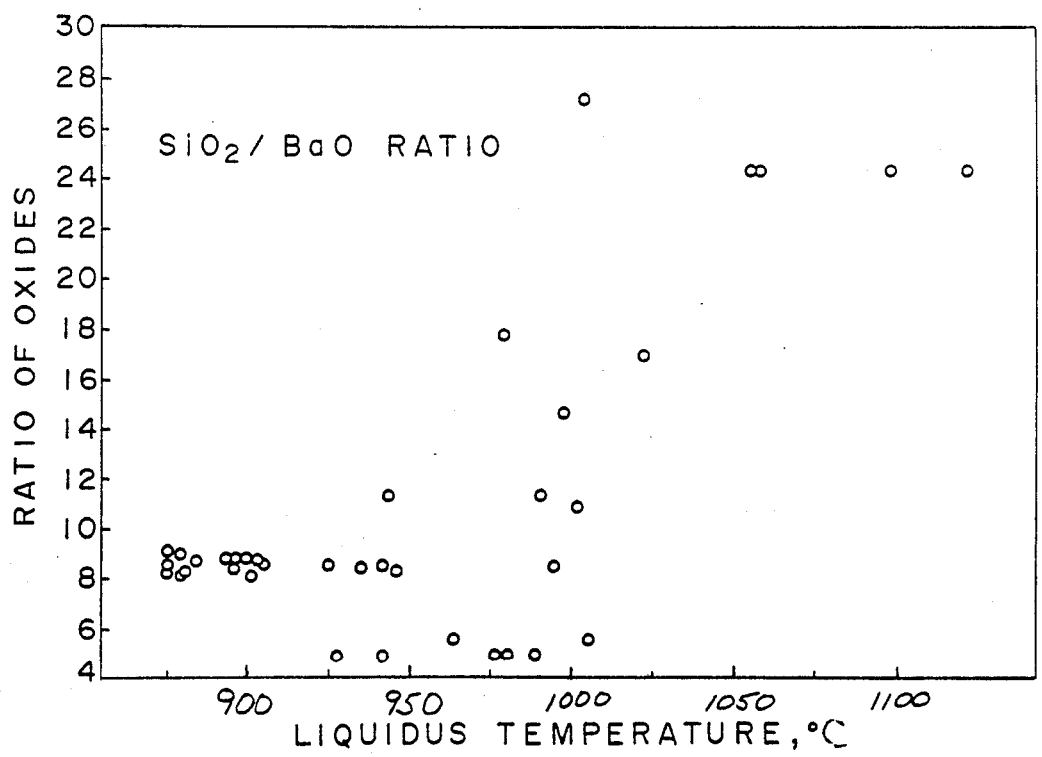
FIG.6-SiO₂/BaO RATIO BELOW 15; LOW LIQUIDUS

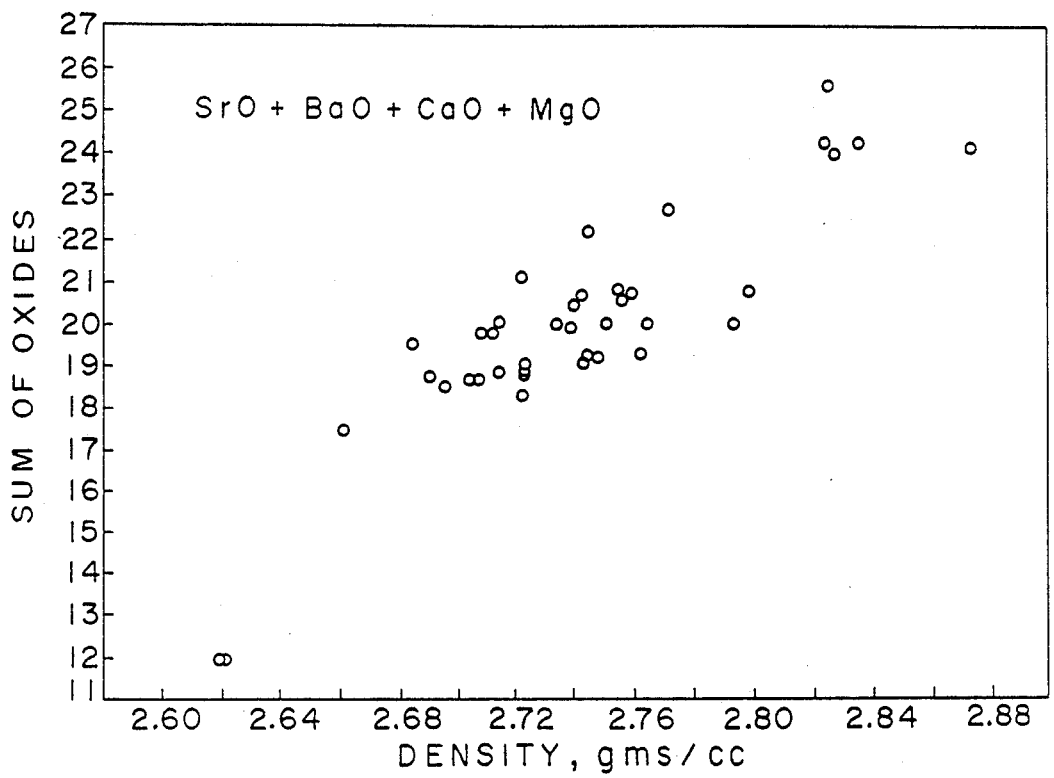
FIG. 7 — INCREASE ALKALINE EARTHS RAISES DENSITY
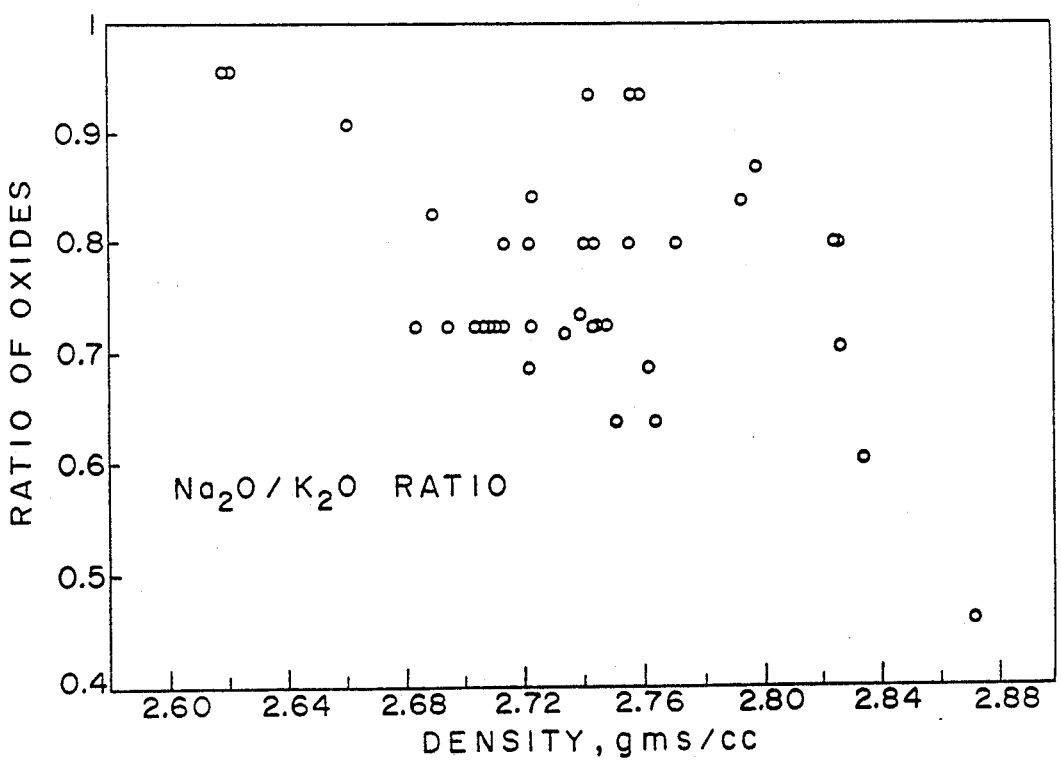
FIG. 8 — DECREASE $Na_2O/K_2O$ RATIO RAISES DENSITY DECREASE SrO/BaO RATIO LOWERS STRAIN POINT

X-RAY ABSORBING GLASS COMPOSITIONS

FIELD OF THE INVENTION

The present invention relates to a glass, which is particularly adapted to be melted in conventional glass melting furnaces and formed on a molten tin bath, and which demonstrates exceptional absorption of X-rays and having good resistance to electron browning and/or X-ray browning.

BACKGROUND OF THE INVENTION

X-radiation is produced when moving electrons are decelerated or stopped due to collisions with the atoms of a substance. The intensity of this X-radiation is function of the accelerating voltage, the electron current, and the atomic number of the material bombarded.

In X-ray tubes, electrons from a hot cathode are focused into a small spot and accelerated to the anode or target. A television picture tube contains the same basic elements as an X-ray tube, that is a focused beam of electrons and a high D.C. accelerating voltage.

In computer monitor and color television picture tube applications, higher voltages are employed than in "black and white" applications, making X-ray emission absorption a very important consideration, particularly in the area of the glass tube face plate.

The prior art is replete with glass compositions directed to the absorption of X-rays, as for example U.S. Pat. Nos. 3,464,932, 4,015,966, 4,065,696, 4,065,697. Many of the glass compositions disclosed in the prior art may adequately absorb X-ray emissions but contain certain levels of materials that significantly interfere with the "standard" glass manufacturing processes.

The glass composition should be compatible with the refractories used in the glass melting and forming apparatus such that it does not cause the refractories to dissolve at an accelerated rate during glass melting and forming. In addition, the glass composition should not contain materials which will volatilize during glass melting and forming, since this will damage the refractory superstructures and also cause emissions of noxious odors and gases.

If the conventional molten tin float glass forming process is employed, as disclosed in U.S. Pat. Nos. 3,220,816 and 3,843,346, the glass composition should be compatible with the molten tin and should not contain any easily reducible oxides which will cause a film to form on the glass at the tin/glass interface. An easily reducible oxide will also tend to contaminate the tin bath with undesirable materials which may cause flaws in subsequently formed glass.

While certain of the prior art X-ray absorbing glass compositions have satisfied several of these important problems, none of these glass compositions have provided a glass which is particularly adapted to be manufactured by conventional float glass melting and forming processes and equipment and which demonstrates exceptional absorption of X-rays.

SUMMARY OF THE INVENTION

The present invention provides a glass which is particularly adapted to be manufactured by conventional glass melting and forming processing and equipment and which demonstrates exceptional absorption of X-rays and more particularly, provides a minimum linear absorption coefficient, measured at 0.6 Angstroms, of 24/cm. of glass thickness. The glass also provides good resistance to electron browning and X-ray browning. In one particular embodiment of the invention, the glass composition includes $SiO_2$ and $Al_2O_3$ combining to constitute about 57.0 to 68.0 weight percent of the glass composition with $SiO_2$ constituting about 57.0 to 66.0 weight percent and $Al_2O_3$ constituting about 0 to 5.0 weight percent; $K_2O$ and $Na_2O$ combining to constitute about 10.0 to 18.0 weight percent of the glass composition with $K_2O$ constituting about 7.0 to 11.0 weight percent and $Na_2O$ constituting about 4.0 to 8.0 weight percent; BaO and SrO combining to constitute about 16.0 to 24.0 weight percent of the glass composition with BaO constituting about 0 to 13.0 weight percent and SrO constituting about 11.0 to 21.0 weight percent; and $CeO_2$ constituting about 0.1 to 1.0 weight percent of the glass composition.

BRIEF DESCRIPTION OF THE DRAWINGS

FIG. 1 is a graph showing the relationship of network formers to total alkalis and its effect on the glass expansion coefficient.

FIG. 2 is a graph showing the relationship of network formers to the glass expansion coefficient.

FIG. 3 is a graph showing the relationship of strontium oxide to barium oxide and its effect on the glass liquidus temperature.

FIG. 4 is a graph showing the relationship of strontium oxide to sodium oxide and its effect on the glass liquidus temperature.

FIG. 5 is a graph showing the relationship of silicon dioxide to strontium oxide and its effect on the glass liquidus temperature.

FIG. 6 is a graph showing the relationship of silicon dioxide to barium oxide and its effect on the glass liquidus temperature.

FIG. 7 is a graph showing the change of the sum of alkaline earths (i.e. SrO+BaO+CaO+MgO) and their effect on the glass density.

FIG. 8 is a graph showing the relationship of sodium oxide to potassium oxide and its effect on the glass density.

DETAILED DESCRIPTION OF THE INVENTION

Figure 9:
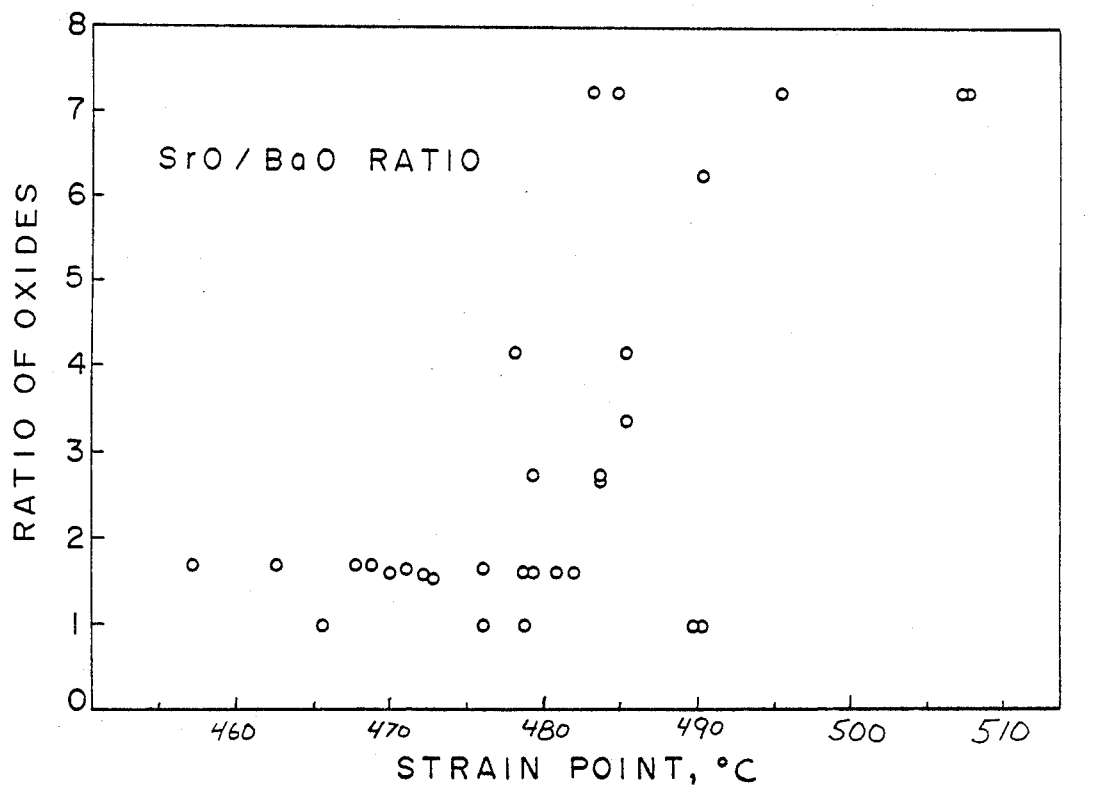
FIG. 9 is a graph showing the relationship of strontium oxide to barium oxide and its effect on the glass strain point.

The process of making glass is energy intensive requiring the expenditure of considerable energy to make a final product free of defects. It is, therefore, highly desirable that the glass composition, of the type generally contemplated by this invention, be relatively easy to melt with a log ten viscosity=2.0 of less than 2650° F. (1460° C.). The method used to measure the temperatures for the range of log ten viscosity=2.0 to 6.0 is in accordance with American Society for Testing Material (ASTM) Method C 965-81.

It is also desirable that the glass composition have a positive working range which is defined as the difference between its temperature at log ten viscosity=4.0 and the liquidus temperature. The liquidus temperature is defined as the temperature at which the first crystal forms when cooling or where crystals first dissolve when heating. ASTM Method C 829-81 is one method of measuring the liquidus temperature.

When glass is used as a face plate on a cathode ray tube (CRT), the glass properties of expansion coefficient and strain point are critical because the face plate must be fused to the funnel part of the CRT. The CRT is thereafter sealed and a vacuum is applied to the interior of the assembled tube which creates a strain on the overall glass tube structure. The fused area between the face plate and the funnel is an area where the strains are generally higher than at any other portion of the glass tube structure. Therefore, both the expansion coefficient and the strain point of the face plate must closely match the both the expansion coefficient and the strain point of the funnel tube to prevent stress build-up in the common area or junction where both glass compositions are fused together. ASTM Method E 228-71 is a method of measuring the expansion coefficient and ASTM Method C 336-71 is a method of measuring the annealing range and the strain point.

The above-described desirable glass properties are all evidenced by the glass of the present invention and several examples of the recorded numerical values of these properties are as set forth in some detail below in the description of this invention.

It is also very important that glass compositions not dissolve the refractories where there is glass contact during melting nor should the glass contain materials which may volatilize and react with the refractories used in the head space within the glass melting apparatus. ASTM Method C 621-68 is a method of testing the corrosion resistance of refractories.

The glass of the present invention is less corrosive to refractories than typical prior art X-ray absorbing glasses and particularly less corrosive than glass adapted to be formed using the float glass forming process. The float glass forming process is a well known prior art process and is described in U.S. Pat. Nos. 3,220,816 and 3,843,346.

The following Table 1 indicates the difference in metal line cuts in a 48 hour test with typical soda-lime-silica float glass (denoted as "A") and the glass of the present invention (denoted as "B") relative to the refractories used in glass making furnaces based on ASTM Method C 621-68 testing.

An example of a composition (by weight percent) of a typical soda-lime-silica glass formed by the float glass forming process and used in Table 1 below, is as follows:

| $SiO_2$ | 73.07 | $SO_3$ | 0.24 |
|---|---|---|---|
| $Na_2O$ | 13.77 | $Fe_2O_3$ | 0.088 |
| $K_2O$ | 0.04 | $Al_2O_3$ | 0.12 |
| MgO | 3.84 | SrO | 0.007 |
| $ZrO_2$ | 0.009 | CaO | 8.81 |

TABLE 1

METAL LINE CUTS OF GLASS ON REFRACTORIES

| GLASS COMPOSITION | REFRACTORY* | TEMP. (°C.) | METAL LINE CUT (cm.) |
|---|---|---|---|
| A (Prior Art) | MONOFRAX S3 | 1454 | 0.081 |
| B (Present Invention) | MONOFRAX S3 | 1454 | 0.043 |
| A | MONOFRAX S3 | 1510 | 0.208 |
| B | MONOFRAX S3 | 1510 | 0.066 |
| A | MONOFRAX M | 1454 | 0.226 |
| B | MONOFRAX M | 1454 | 0.079 |
| A | MONOFRAX M | 1510 | 0.396 |
| B | MONOFRAX M | 1510 | 0.262 |
| A | MONOFRAX Z | 1454 | 0.109 |
| B | MONOFRAX Z | 1454 | 0.097 |
| A | MONOFRAX Z | 1510 | 0.417 |

TABLE 1-continued

METAL LINE CUTS OF GLASS ON REFRACTORIES

| GLASS COMPOSITION | REFRACTORY* | TEMP. (°C.) | METAL LINE CUT (cm.) |
|---|---|---|---|
| B | MONOFRAX Z | 1510 | 0.302 |

*Each of the refractories listed in the above Table 1 are as manufactured by the Carborundum Corporation of Niagara, New York under the above noted trade designations.

When glass is exposed to high voltage X-rays, as for example the glass face plate in color television picture tube applications, most prior art glass compositions will become discolored or "brown". It is, therefore, highly desirable that the glass composition contain a material which prevents the browning to maintain a high degree of light transmission. Cerium oxide performs this function in the composition of the present invention very well.

In order to form glass compositions using a molten tin float glass forming process, the glass should not contain any materials which will strongly reduce the tin. If the tin becomes reduced by one or several glass components, a tin film will form on the bottom surface of the formed glass which will severely limit the light transmission through the glass. Also any such undesirable component in the glass would likely diffuse into the molten tin bath causing the tin bath to be "poisoned" and result in defects in subsequent glass compositions formed on the same bath. An example of such an undesirable glass component as found in certain prior art glass compositions is lead oxide. Lead oxide has been commonly used in some X-ray absorbing glass compositions because it readily absorbs X-rays.

There are six components necessary to meet the above described requirements of an X-ray absorbing glass composition which can be melted in a conventional glass-making furnace and that can be formed on a molten tin bath. The six commonly used batch components are: sand, soda ash, potassium carbonate, barium carbonate, strontium carbonate and cerium carbonate. Other batch materials may be used as long as they contain the necessary oxides as listed below. The resultant glass product then contains the following essential oxides: silicon dioxide ($SiO_2$), sodium oxide ($Na_2O$), potassium oxide ($K_2O$), barium oxide (BaO), strontium oxide (SrO) and cerium oxide ($CeO_2$).

Since other glass compositions may be melted in a particular tank prior to the melting of the glass of the present invention, the final product may contain remnants of the previously melted glass compositions and/or minute amounts of dissolved refractories from the glass furnace. The glass of the present invention may also contain small amounts of components normally used to color glass in order to provide a desired light transmission, although colorants are not an essential element to the present invention.

Therefore, glass of this invention contains less than 2% of colorants, dissolved refractories, tramp components from batch materials, or remnants of compositions previously melted in the furnace. None of these 2% or less components are essential to meet the requirements of this invention nor would they generally adversely affect the desired properties of the glass of this invention.

The function of $SiO_2$ in this glass composition is to act as a network former and provide the basic structure of a glassy matrix. Other minor network formers in glasses of this invention include alumina oxide (Al$_2$O$_3$), sulfur trioxide (SO$_3$) and cerium oxide (CeO$_2$).

Na$_2$O and K$_2$O are alkalis used in glass compositions of this invention to aid in melting the glass and to adjust the expansion coefficient of the composition.

Several of the above described highly desirable physical properties of the glass of this invention are as shown in FIGS. 1 to 9.

The expansion coefficient, which is depicted in FIGS. 1 and 2, is a critical physical property in that there must be a close expansion "match" between the face plate glass and the funnel glass of a cathode ray tube, the former being sealingly fused to the latter. The expansion coefficient of the glass of this invention can be so adjusted to match the range of expansion coefficients of the typical funnel glasses to ensure an efficient and effective fusion therebetween.

FIG. 1 is a graph which shows that when the ratio of network formers to total alkalis is lowered the expansion coefficient increases.

FIG. 2 is a graph which also shows that when the total of network formers is lowered the expansion coefficient increases.

The liquidus temperature which is depicted in FIGS. 3 to 6, is also a critical physical property in that it is essential to maintain a low liquidus temperature. Low liquidus temperatures permit glass forming without concern from spontaneous crystallization which adversely affects all types of glass forming operations.

FIG. 3 is a graph which shows that as the ratio SrO to BaO decreases, the liquidus temperature is lowered. Both SrO and BaO function as major absorbers of X-rays in the glass of this invention. SrO is relatively a better X-ray absorber than BaO, but BaO is essential to maintain a low liquidus temperature for the glass of this invention.

FIG. 4 is a graph which shows that the liquidus temperature is lowered when the ratio of SrO to Na$_2$O is decreased.

FIG. 5 is a graph which shows that increasing the ratio between SiO$_2$ and SrO will also decrease the liquidus temperature.

FIG. 6 is a graph which shows that when the SiO$_2$ to BaO ratio is below 15 then the liquidus temperature will be below 1016° C. (1850° F.).

The glass density, which is depicted in FIGS. 7 and 8, is also a critical physical property in that it enhances the X-ray absorption properties of the glass. The mass X-ray absorption coefficient is calculated at 0.6 Angstroms by the method described on page 20, Table 5 in Electronic Industries Association (EIA) publication No. TEP-194, prepared by EIA Tube Engineering FIG. 7 is a graph which shows that as the concentration of the alkaline earths (i.e. SrO+BaO+CaO+MgO) increases, the glass density increases.

FIG. 8 is a graph which also shows that as the ratio between Na$_2$O and K$_2$O decreases the glass density increases.

The strain point, which is depicted in FIG. 9, is also a another critical physical property. A low strain point becomes very important when fusing a face plate of a CRT to the funnel. The fusing of these tube parts should be accomplished without generating any stresses in the area of the fusing junction.

FIG. 9 is a graph which shows that as the ratio between SrO and BaO decreases the strain point is lowered.

As before indicated, CeO$_2$ is a good X-ray absorber and performs that function in the glass composition of the present invention as well as the primary function of preventing X-ray browning. As above described, X-ray browning lowers the light transmission quality of the glass and typically occurs when the glass is exposed to a high voltage electron source which emits X-rays.

Table 2 below records a number of glass compositions expressed in terms of parts by weight on the oxide basis, illustrating parameters of the present invention. Because the sum of the individual components closely approximates 100, for all practical purposes the tabulated values may be considered to represent weight percent. The ingredients actually making up the batch for each glass may comprise any materials, either oxides or other compounds, which when melted together, will be converted into the desired oxides in the proper proportions. As before indicated, glasses of this invention may contain other minor network formers including Al$_2$O$_3$, SO$_3$ and CeO$_2$. As also before indicated, glass of this invention may contain colorants, fining agents, dissolved refractories, tramp components from batch materials, or remnants of compositions previously melted in the furnace. More particularly, the batch may include colorants, such as but not limited to, NiO, CoO, Se and Fe$_2$O$_3$ and fining agents, such as but not limited to, Na$_2$SO$_4$ and CaF$_2$. These materials account for up to 2 weight percent and preferably less than 1 weight percent of the batch composition. Similarly, dissolved refractory, such as but not limited to, ZrO$_2$, tramp material, such as but not limited to, TiO$_2$, and remnant materials, such as but not limited to, CaO and MgO account for up to 1 weight percent and preferably less than 0.5 weight percent of the batch composition.

Table 3 reports measurements of physical properties carried out on the specimens using the above indicated testing methods.

Panel Advisory Council.

TABLE 2

| OXIDE | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
| --- | --- | --- | --- | --- | --- | --- | --- | --- |
| SiO$_2$ | 57.79 | 65.20 | 59.63 | 59.97 | 63.85 | 65.48 | 64.00 | 64.40 |
| Na$_2$O | 6.43 | 7.04 | 6.64 | 4.78 | 6.60 | 6.80 | 7.00 | 6.16 |
| K$_2$O | 8.06 | 8.83 | 8.33 | 10.46 | 9.00 | 7.50 | 7.50 | 8.52 |
| SrO | 11.29 | 20.55 | 17.59 | 11.73 | 12.00 | 15.00 | 13.00 | 11.36 |
| BaO | 11.96 | 0.00 | 2.45 | 12.43 | 7.90 | 2.42 | 7.75 | 7.10 |
| Al$_2$O$_3$ | 1.89 | 0.00 | 4.73 | 0.00 | 0.00 | 2.00 | 0.00 | 1.86 |
| CeO$_2$ | 0.13 | 0.28 | 0.53 | 0.53 | 0.50 | 0.50 | 0.50 | 0.50 |

TABLE 3

| PROP. | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
| --- | --- | --- | --- | --- | --- | --- | --- | --- |
| STRAIN POINT IN °C. | 491 | 492 | 507 | 490 | 463 | 491 | 469 | 479 |

TABLE 3-continued

| PROP. | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| DENSITY AT 20° C. IN GRAMS/CC. | 2.824 | 2.756 | 2.714 | 2.871 | 2.739 | 2.661 | 2.756 | 2.695 |
| EXPANSION COEFFICIENT ($\times 10^{-6}/°C.$) FROM 25-300° C. | 10.57 | 10.66 | 10.28 | 11.01 | 10.08 | 9.52 | 10.95 | 9.97 |
| 24 HOUR LIQUIDUS TEMPERATURE IN °C. | 985 | 1075 | 1116 | 938 | 890 | 999 | 877 | 873 |
| LINEAR ABSORPTION COEFFICIENT (PER CM OF GLASS THICKNESS) | 32.2 | 36.9 | 33.8 | 34.1 | 29.7 | 29.5 | 31.1 | 27.9 |

The glass compositions of Table 2 were prepared as follows:

(a) The batch components were weighed on a laboratory balance scale and then mixed in a V-shaped blender for approximately ten minutes.

(b) Approximately 1.5 pounds (0.68 kg) of the mixed batch components were melted in a four-inch diameter, four-inch high (10.2 cm by 10.2 cm) platinum/rhodium crucible for two hours at 2550° F. (1399° C.).

(c) The glass was then fritted by pouring it carefully into a container cooled by running water. The glass was thereby shattered and thereafter the water was drained and the glass was returned to a crucible.

(d) The fritted glass was melted for four hours at 2700° F. (1482° C.).

(e) The glass was poured on a steel casting table and rolled to a nominal thickness of 0.25 inch (0.64 cm) thickness.

(f) The glass was annealed in a lehr from a temperature of 1200° F. (649° C.). The glass was slowly cooled for approximately sixteen hours. The glass was then cut into sample segments.

The glass sample segments were then ready for the tests using the above referred to testing techniques.

It was observed that the total amount of network formers and alkalis each affected the coefficient of linear expansion of the glass samples but in opposite ways. More particularly, as the total amount of network formers increased, the expansion coefficient dropped. Conversely, as the total amount of alkalis increased, the expansion coefficient increased. As a result, although not limiting in the present invention, in a preferred embodiment of the invention, the network formers in the form of $SiO_2$ and $Al_2O_3$ combined to constitute between about 57 to 68 weight percent of the glass batch, with the $SiO_2$ constituting about 57 to 66 weight percent and the $Al_2O_3$ constituting about 0 to 5 weight percent. In addition, the and the $Al_2O_3$ constituting about 0 to 5 weight percent. In addition, the alkalis in the form of $K_2O$ and $Na_2O$ combined to constitute between about 10 to 28 weight percent, with $K_2O$ constituting about 7 to 11 weight percent and $Na_2O$ constituting about 4 to 8 weight percent. In a more preferred embodiment of the invention, the $SiO_2$ and $Al_2O_3$ combined to constitute about 61 to 67 weight percent, with the $SiO_2$ constituting about 61 to 66 weight percent and the $Al_2O_3$ constituting about 0 to 3 weight percent, and the $K_2O$ and $Na_2O$ combined to constitute between 14 to 17 weight percent of the glass batch, with the $K_2O$ constituting about 7.5 to 9.5 weight percent and the $Na_2O$ constituting about 6.5 to 7.5 weight percent.

It was further observed that as the amount of BaO and SrO increased, the liquidus temperature of the glass batch increased resulting in defects forming in the glass which would cause the glass to break as it cooled. As a result, although not limiting in the present invention, it is preferred that the BaO and SrO combine to constitute between 16 to 24 weight percent of the glass batch, with BaO constituting about 0 to 13 weight percent and SrO constituting about 11 to 21 weight percent. Furthermore, it is more preferable that the BaO and SrO combine to constitute about 17 to 22 weight percent of the glass batch, with the BaO constituting about 3 to 8 weight percent and the SrO constituting about 11.5 to 15 weight percent.

As can be adjudged from the above Tables 2 and 3 and the previous discussion of the present invention, a glass composition within the ranges of the claimed invention exhibits the desired properties, including the desired melting and forming behavior and physical properties.

I claim:

1. An X-ray absorbing glass with a minimum linear absorption coefficient, measured at 0.6 Angstroms, of 24/cm. of glass thickness which resists electron browning and/or X-ray browning, consisting of the following components, by weight percent: $SiO_2$ constituting about 57.0 to 66.0%; $Al_2O_3$ constituting about 0 to 5.0%; $K_2O$ constituting about 7.0 to 11.0%; $Na_2O$ constituting about 4.0 to 8.0%; BaO constituting about 0 to 13.0%; SrO constituting about 11.0 to 21.0%; $CeO_2$ constituting about 0.1 to 1.0%; and dissolved refractories, tramp components from batch materials, remnants of previously melted glass batches, fining agents and colorants constituting a total amount less than 1.2%.

2. The glass of claim 1 wherein $SiO_2$ constitutes about 61.0 to 66.0%; $Al_2O_3$ constitutes about 0 to 3.0%; $K_2O$ constitutes about 7.5 to 9.5%; $Na_2O$ constitutes about 6.5 to 7.5%; BaO constitutes about 3.0 to 8.0%; SrO constitutes about 11.5 to 15.0%; and $CeO_2$ constitutes about 0.2 to 0.6%.

3. The glass of claim 1 wherein $SiO_2$ and $Al_2O_3$ constitute about 57.0 to 68.0%; $K_2O$ and $Na_2O$ constitute about 10.0 to 18.0%; BaO and SrO constitute about 16.0 to 24.0%; and $CeO_2$ constitutes about 0.1 to 1.0%.

4. The glass of claim 3 wherein $SiO_2$ and $Al_2O_3$ constitute about 61.0 to 67.0%.

5. The glass of claim 3 wherein $K_2O$ and $Na_2O$ constitute about 14.0 to 17.0%.

6. The glass of claim 3 wherein BaO and SrO constitute about 17.0 to 22.0%.

7. The glass of claim 3 wherein $CeO_2$ constitutes about 0.2 to 0.6%.

8. The glass of claim 3 wherein $SiO_2$ and $Al_2O_3$ constitute about 61.0 to 67.0% with $SiO_2$ constituting about 61.0 to 66.0% and $Al_2O_3$ constituting about 0 to 3.0%.

9. The glass of claim 3 wherein $K_2O$ and $Na_2O$ constitute about 14.0 to 17.0% with $K_2O$ constituting about 7.5 to 9.5% and $Na_2O$ constituting about 6.5 to 7.5%.

10. The glass of claim 3 wherein BaO and SrO constitute about 17.0 to 22.0% with BaO constituting about 3.0 to 8.0% and SrO constituting about 11.5 to 15.0%.

11. The glass of claim 3 wherein $SiO_2$ and $Al_2O_3$ constitute about 61.0 to 67.0% with $SiO_2$ constituting about 61.0 to 66.0% and $Al_2O_3$ constituting about 0 to 3.0%; $K_2O$ and $Na_2O$ constitute about 14.0 to 17.0% with $K_2O$ constituting about 7.5 to 9.5% and $Na_2O$ constituting about 6.5 to 7.5%; BaO and SrO constitute about 17.0 to 22.0% with BaO constituting about 3.0 to 8.0% and SrO constituting about 11.5 to 15.0% and $CeO_2$ constitutes about 0.2 to 0.6%.

12. A cathode ray tube comprising a glass funnel portion, a glass faceplate sealingly fused thereto, an electron gun disposed within said cathode ray tube, said electron gun emitting high voltage X-rays, at least said faceplate being formed from an X-ray absorbing glass with a minimum linear absorption coefficient, measured at 0.6 Angstroms, of 24/cm. of glass thickness which resists electron browning and/or X-ray browning consisting of the following components, by weight percent: $SiO_2$ and $Al_2O_3$ constituting about 61.0 to 67.0% with $SiO_2$ constituting about 61.0 to 66.0% and $Al_2O_3$ constituting about 0 to 3.0%; $K_2O$ and $Na_2O$ constituting about 14.0 to 17.0% with $K_2O$ constituting about 7.5 to 9.5% and $Na_2O$ constituting about 6.5 to 7.5%; BaO and SrO constituting about 17.0 to 22.0% with BaO constituting about 3.0 to 8.0% and SrO constituting about 11.5 to 15.0%; $CeO_2$ constituting about 0.2 to 0.6%; and dissolved refractories, tramp components from batch materials, remnants of previously melted glass batches, fining agents and colorants constituting a total amount less than 1.2%.

* * * * *